United States Patent Office 3,497,182
Patented Feb. 24, 1970

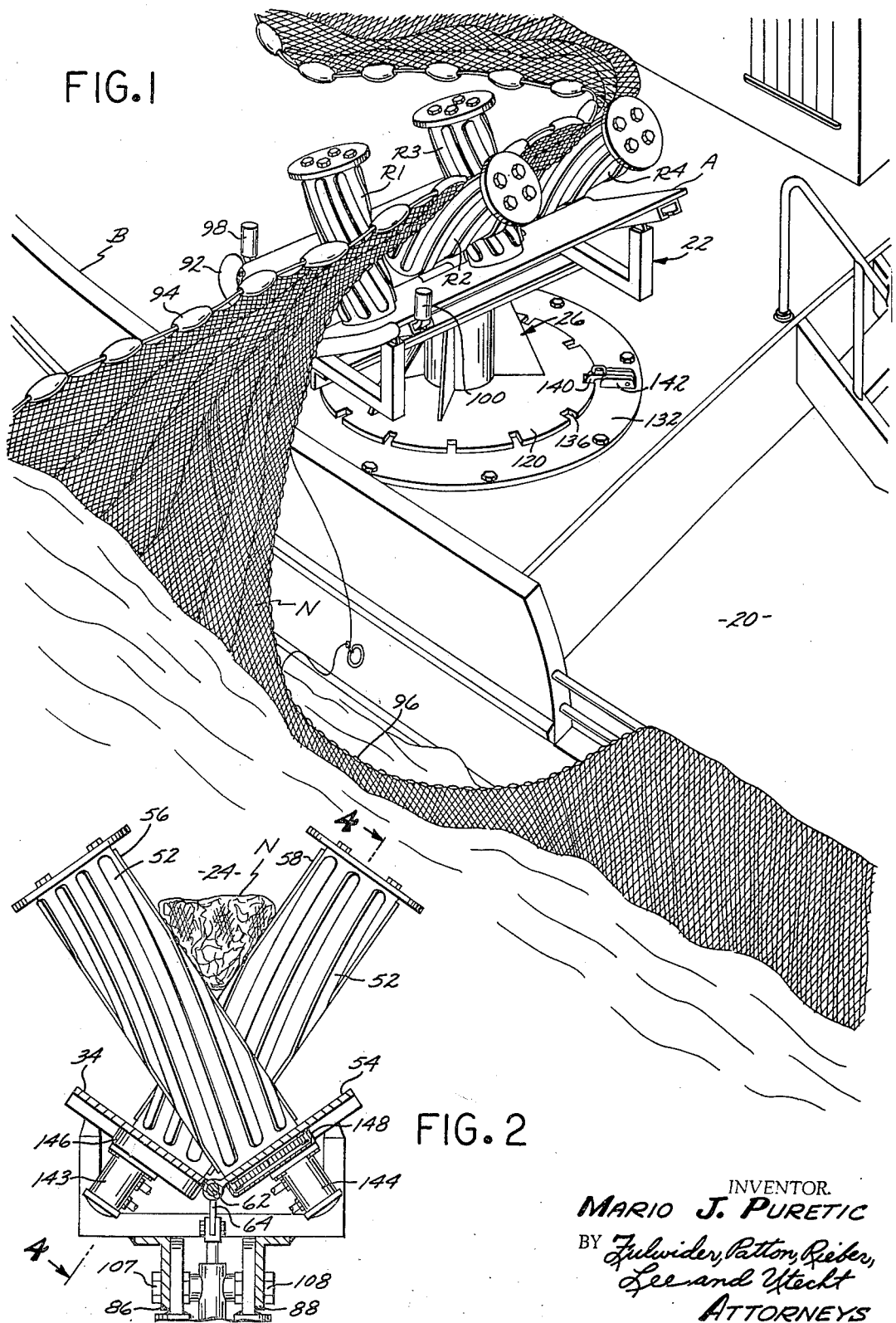

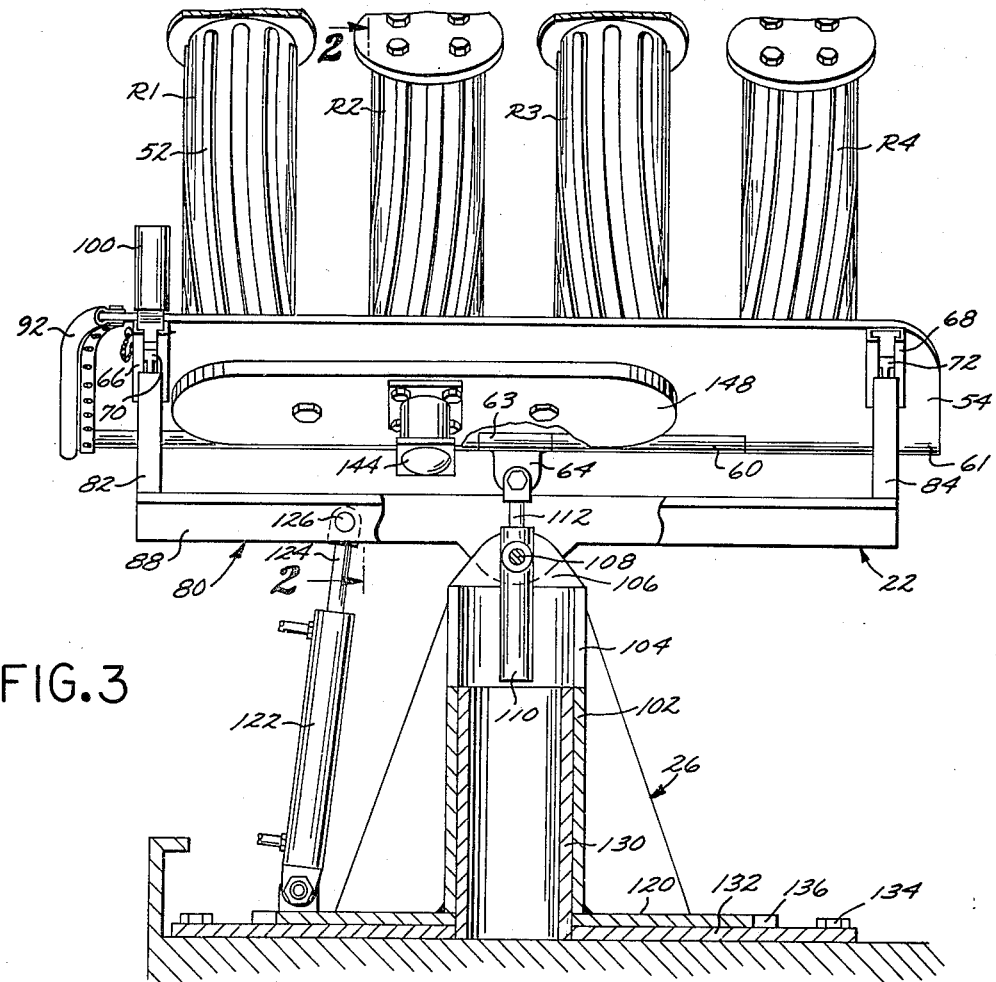
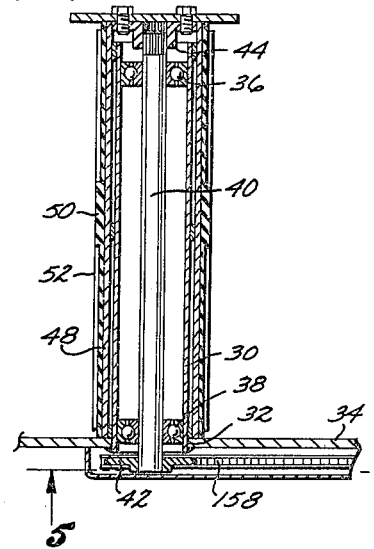
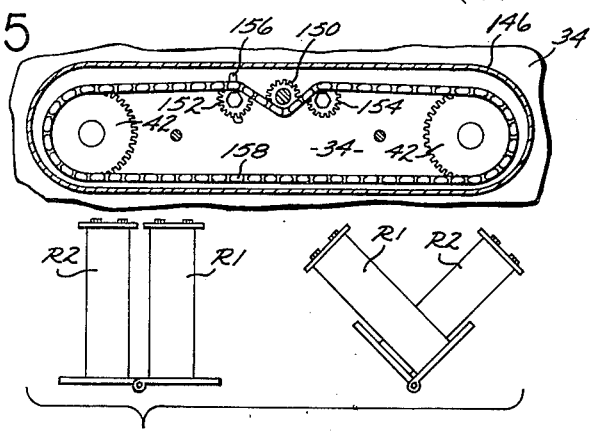

3,497,182
POWER ROLLERS FOR RETRIEVING FISH NETS
Mario J. Puretic, 259 6th Ave. N., Monte Cristo Isle, Tierra Verde, Fla. 33715
Filed Jan. 19, 1968, Ser. No. 699,118
Int. Cl. A01k *73/06;* B65h *17/22*
U.S. Cl. 254—138                                                12 Claims

ABSTRACT OF THE DISCLOSURE

A retrieving apparatus for pulling a fishing net from a submerged expanded fish-catching position onto the deck of a fishing boat in a gathered-together position. The apparatus includes a plurality of rollers mounted on a frame for rotation about their longitudinal axes. The longitudinal axes intersect so that a portion of the proximate sides of the rollers define a generally V-shaped gap that receives the net. The rollers are supported upon a frame which also carries hydraulic motors which concurrently rotate the rollers about their longitudinal axes. The proximate sides of the rollers frictionally grip the net during such rotation to thereby move the net from its fish-catching position to its gathered-together position on the deck of the fishing boat. The angle between the longitudinal axes of the rollers is adjustable so as to vary the amount of friction applied to the net. Additionally, the frame is adjustable relative to the deck of the boat to facilitate the net retrieving operation.

BACKGROUND OF THE INVENTION

Field of the invention

The present invention relates generally to the field of commercial fishing and more particularly to a net retrieving apparatus adapted to efficiently retrieve a fishing net from a submerged and expanded fish-catching position onto the deck of a fishing boat in a gathered-together position.

Description of prior art

It is known to provide fishing boats with a so-called "power block" for raising a purse seine net from a submerged, expanded fish-catching position to an elevated position above the deck of a boat from where the net is subsequently lowered as a moving column that can be stacked in a desired configuration on the deck. A power block of this type is disclosed in my U.S. Patent No. 2,733,531 issued Feb. 7, 1956. It is also known to retrieve a submerged purse seine net from a submerged fish-gathering position onto the deck of a fishing boat in a gathered-together position by means of a pair of adjacently disposed, generally upwardly extending fairlead members, the space between such fairlead members receiving the fishing net. Such fairlead members are concurrently power rotated in opposite directions. This type of apparatus is disclosed in my U.S. Patent No. 3,069,799, issued Dec. 25, 1962.

SUMMARY OF THE INVENTION

It is the major object of the present invention to provide a net retriever apparatus which need not be mounted in a position elevated above the deck of a fishing boat.

In most fishing areas there is no objection to using an elevated power block for retrieving a fishing net. In certain areas, however, fishermen are loath to utilize an elevated power block and prefer to retrieve the net from the boat deck. While it is possible to mount the aforedescribed power-operated fairleads of the type disclosed in my Patent No. 3,069,799 on the deck of a fishing boat, the frictional gripping power of such power fairleads may not be adequate in all cases to retrieve a heavily loaded fishing net. The net retrieving apparatus of the present invention affords the advantages of an elevated power block with the advantages of a deck mounting arrangement.

It is a major object of the present invention to provide a net retrieving apparatus which utilizes a plurality of rollers which are mounted for rotation about their longitudinal axes, with these axes intersecting whereby a portion of the proximate sides of the rollers define a generally V-shaped gap that receives the net. The rollers are supported by frame means carrying power-operated means which rotate one or more of the rollers about their longitudinal axes, with the proximate sides of the rollers frictionally gripping the fishing net to thereby move the net from a fish-catching position to a gathered-together position on the deck of the fishing boat.

It is another object of the present invention to provide net retrieving apparatus of the aforedescribed nature wherein the angle between the longitudinal axes of the rollers is adjustable to thereby vary the gripping effect of the rollers upon the net.

A further object of the present invention is to provide net retrieving apparatus of the aforedescribed nature wherein adjustment means are provided between the frame and the portion of the frame which carries the rollers to vary the angle between the roller supporting portion of the frame and the deck of the fishing boat to thereby facilitate the net retrieving operation.

Yet a further object of the present invention is to provide net retrieving apparatus of the aforedescribed nature which is simple in design, rugged of construction and foolproof in use.

Other objects and advantages of the present invention will become apparent from the following detailed description, when taken in conjunction with the appended drawings.

DESCRIPTION OF THE DRAWINGS

FIG. 1 is a perspective view showing a preferred form of net retrieving apparatus embodying the present invention mounted on the deck of a fishing boat during a net retrieving operation;

FIG. 2 is a vertical sectional view taken in enlarged scale along line 2—2 of FIG. 1;

FIG. 3 is a side elevational view partly broken away in section showing said net retrieving apparatus;

FIG. 4 is a sectional view taken on line 4—4 of FIG. 2 with the net deleted in the interest of clarity;

FIG. 5 is a horizontal sectional view taken on line 5—5 of FIG. 2; and

FIG. 6 is a diagrammatic front view showing the angle through which the longitudinal axes of the roller members of said net retrieving apparatus may be adjusted.

DESCRIPTION OF THE PREFERRED EMBODIMENT

Referring to the drawings and particularly FIG. 1 thereof there is shown a preferred form of net retrieving apparatus A embodying the present invention mounted on the deck 20 of a fishing boat B. The net retrieving apparatus A is shown pulling a fish net N from a submerged, expanded fish-catching position onto the deck 20 in a gathered-together position. The net retrieving apparatus A includes a plurality (such as four) of rollers R1, R2, R3 and R4. The rollers are supported on frame means, generally designated 22, for rotation about their longitudinal axes. The longitudinal axes of the rollers R intersect so that a portion of the proximate sides of the rollers define a generally V-shaped gap 24 (FIG. 2) that receives the net N. The frame means 22 also supports power-operated means not visible in FIG. 1 which concurrently rotate the rollers R about their longitudinal axes, with the proximate sides of the rollers frictionally gripping the net N to thereby move the net from its fish-catching to its gathered-together position, as indicated by the directional arrows in this figure. Mounting means, generally designated 26, are interposed between the frame means 22 and the deck 20 of the fishing boat B.

More particularly, and with additional reference to the other figures of the drawings, the rollers R are of like construction, and as indicated particularly in FIG. 4 each include a steel cylinder 30 having its lower end rigidly affixed as by welding within a bore 32 formed in a right-hand mounting plate 34 of frame 22. The upper and lower interior portions of the cylinder 30 carry upper and lower ball bearings 36 and 38, respectively. These bearings rotatably support a shaft 40 having its lower end keyed to a sprocket 42 and its upper end splined to a boss 44. The boss 44 is rigidly secured as by welding within the upper end of the cylinder 30. A disc 46 of greater diameter than cylinder 30 is bolted to the boss 44 to assist in retaining net N within gap 24. An outer steel sleeve 48 is telescopically concentrically mounted with respect to the cylinder 30, the upper end of such sleeve being rigidly affixed to the boss 44. The exterior surface of the sleeve 48 is adhered to a rubber coating 50 that is preferably formed with generally longitudinally extending flutes 52. Since the construction of the other rollers R2, R3 and R4 is substantially similar to that of the aforedescribed roller R1 it is not necessary to repeat a description of each of such rollers.

The frame means 22 supporting the rollers R include in addition to the aforementioned left-hand plate 34 a similar right-hand plate 54. The plates 34 and 54 are pivotally interconnected along their proximate longitudinal axis so as to thereby permit adjustment of the V-shaped gap 24 defined by the proximate surfaces 56 and 58 of the rollers. In this regard, the proximate edges of the plate 34 is formed with integral hinge tubes 60 which longitudinally interfit complementary hinge tubes 61 formed on the inner end of the opposite plate 54. An elongated hinge bar 62 is telescopically received within the aforementioned hinge tubes. The central portion of the hinge bar 62 is supported within a hinge sleeve 63 provided with an integral depending bracket 64, as indicated particularly in FIGS. 2 and 3.

The front and rear portions of the support plates 34 and 54 are provided on their undersides with front and rear transverse channels 66 and 68 (FIG. 3). These channels 66 and 68 receive front and rear slider elements 70 and 72, respectively, formed upon the front and rear portions of a rigid subframe, generally designated 80. The subframe 80 includes a pair of front and rear, generally U-shaped uprights 82 and 84, with the upper ends of the legs thereof being formed with the aforementioned slider elements 70 and 72. The lower leg of each of the uprights 82 and 84 are rigidly secured, as by welding, to the upper legs of a pair of generally L-shaped support arms 86 and 88 spaced equidistantly from the center-line of these uprights, as indicated particularly in FIG. 2. Preferably, the front end of support plates 34 and 54 carry a transversely extending resilient guide tube 92 for facilitating entrance of the net N and its associated float line 94 and lead line 96 into the gap 24. The front ends of these plates may also be provided with upstanding net guides 98 and 100 if desired.

The mounting means 26 interposed between the frame means 22 and the deck 20 include a pedestal 102. The upper end of this pedestal is slotted at 104 and formed with a pair of upstanding ears 106 which are provided with horizontally aligned bores that receive a pair of horizontal pivot pins 107 and 108. Such pivot pins 107 and 108 also extend through the midportion of the support arms 86 and 88. The inner ends of these pivot pins are rotatably received by suitable bushings formed on the upper portion of a hydraulic gap adjustment cylinder 110 of conventional construction disposed within pedestal 102. A plunger 112 extends upwardly through the top of cylinder 110 and has its upper end pivotally connected in bracket 64 of hinge sleeve 63.

The lower end of the pedestal 102 is rigidly affixed as by welding to a circular adjustment plate 120. The front portion of the adjustment plate 120 is pivotally affixed to the lower end of a hydraulic tilting cylinder 122. A plunger 124 extends upwardly from the tilting cylinder 122 and has its upper end pivotally connected to a horizontal pivot pin 126 carried by the support arms 86 and 88 intermediate their midportion and their front ends. It will be apparent that actuation of the plunger 124 of the tilting cylinder 122 will serve to tilt the support arms 86 and 88 about the horizontal pivot pins 107 and 108, and thus adjust the vertical angle between the frame means 22 and mounting means 26.

The pedestal 102 forms part of the mounting means 26 and is rotatably supported upon an upstanding post 130 disposed within a centrally apertured circular mounting plate 132 that is secured to the boat deck 20 as by bolts 134. The periphery of the adjustment plate 120 is formed with a plurality of circumferentially spaced slots 136 which selectively receive the free end of a radially extending locking finger 140 having its rear portion pivotally secured between a pair of upstanding lugs 142 secured upon upper surface of the mounting plate 132. With this arrangement, the pedestal 102 may be adjusted to a desired angular position relative to the mounting plate 132 and thereafter locked against rotation relative to such mounting plate by positioning the locking finger 140 within the desired slot 136.

Referring now particularly to FIGS. 2, 3 and 5, the rollers R are rotated by means of left-hand and right-hand hydraulic motors 143 and 144. These hydraulic motors are positioned below covers 146 and 148 secured to the undersides of the plates 34 and 54. Referring now particularly to FIG. 5, the drive shaft of each hydraulic motor is keyed to a drive sprocket 150 positioned between two idler sprockets 152 and 154. One of the idler sprockets 150 is secured to a shaft positioned within a slot 156 formed in the plate 34 and adjustable therealong so as to vary the tension of a chain 158 which drivingly interconnects the drive sprocket 150 and the sprockets 42 keyed to the lower end of roller posts 40. It will be apparent, however, that the hydraulic motors could be disposed at the upper portion of the rollers and that although all of the rollers R1, R2, R3 and R4 are shown as being powered, it will be possible to power less than all of such rollers. If one or more of the rollers are not powered they may be permitted to idle on their shafts 40.

In the operation of the aforedescribed net retrieving apparatus, the support plates 34 and 54 and their associated parts will be moved into generally transverse alignment with respect to the longitudinal axis of the boat B, as indicated in FIG. 1. The exact angle may be selected for most efficient retrieval of the net N and the locking finger 140 thereafter disposed within the desired slot 136 on the adjustment plate 120. It is also possible by swinging the locking finger 140 free of the adjustment plate 120 to allow the frame 22 to freely swing with the net.

With the support plates 34 and 54 and their attached rollers R disposed at the desired angle relative to the net N, one end of the net including its float line 94 and lead line 96 is pulled through the rollers R in a suitable manner. The motors 142 and 144 are then actuated so as to effect rotation of the rollers R. The proximate surfaces 56 and 58 of the rollers R will then frictionally grip the net N to thereby move it from its submerged fish-catching position upwardly onto the deck 20 of the fishing boat. During this operation, the hydraulic tilting cylinder 122 may be actuated so as to vary the vertical angle of the support plates 34 and 54 and hence their rollers R and the boat deck to thereby effect most efficient retrieval of the net. In the event the net is strained, the tilting cylinder 122 will generally be actuated so as to lift the front end of the support plate, while this operation will be reversed if it is desired to "square the net."

The angle between the proximate sides 56 and 58 of the rollers R is adjusted by means of the gap angle adjustment cylinder 110. Thus, upward movement of the plunger 112 of this cylinder will serve to raise the inner edges of the support plates to thereby increase the angle of the gap 24, while downward movement of such plunger will serve to decrease this angle. The angle will be reduced when it is desired to increase the friction being applied to the net by the rollers R. Additionally, in general the lesser the bulk of the net the less the gap angle need be while conversely the greater the net bulk the greater will be the angle of the gap. The wide range of angle adjustment permitted by the aforedescribed construction will be made apparent by reference to FIG. 6.

It will be understood that control over the operation of the gap adjustment cylinder 110, the tilting cylinder 122 and the hydraulic motors 142 and 144 will be effected by conventional hydraulic valving. In this regard, it may be advantageous under certain conditions to adjust the speed of the hydraulic motors 142 and 144 such that the rollers on one side of the frame rotate faster than those on the other side. This permits control over the speed of retrieval of the different sections of the net. It should be noted that although the net retrieving apparatus of the present invention is shown mounted upon the deck of a fishing boat, it may find use in land installations for efficiently handling a fish net.

While there has been shown and described hereinbefore what is presently considered to be the preferred embodiment of the present invention, it will be apparent that various changes and modifications may be made thereto.

I claim:

1. Net retrieving apparatus for use in pulling a fish net from an expanded fish-catching position onto the deck of a fishing boat in a gathered-together position, comprising:
   frame means;
   a plurality of roller means mounted on said frame means for rotation about their longitudinal axis, with the longitudinal axes of said roller means intersecting whereby a portion of the proximate sides of said roller means define a generally V-shaped gap that receives said net;
   power-operated means on said frame means for rotating at least one of said roller means, with the proximate sides of said roller means frictionally gripping said net to thereby move said net from said fish-catching position to said gathered-together position; and mounting means interposed between said frame means and the deck of said fishing boat.

2. Apparatus as set forth in claim 1 wherein the angle between the longitudinal axes of said roller means may be adjusted to thereby vary the gripping effect of said roller means on the net.

3. Apparatus as set forth in claim 1 wherein the vertical angle between said frame means and said mounting means may be adjusted.

4. Apparatus as set forth in claim 1 wherein said mounting means includes a pedestal about the vertical axis of which said frame means may be adjustably pivoted.

5. Apparatus as set forth in claim 2 wherein the vertical angle between said frame means and said mounting means may be adjusted.

6. Apparatus as set forth in claim 2 wherein second power-operated means are connected to said frame means to effect adjustment of the angle between the longitudinal axes of said roller means.

7. Apparatus as set forth in claim 3 wherein additional power-operated means are interposed between said frame means and said mounting means to effect adjustment of said vertical angle.

8. Apparatus as set forth in claim 4 wherein the angle between the longitudinal axes of said roller means may be adjusted to thereby vary the gripping effect of said roller means on the net.

9. Apparatus as set forth in claim 4 wherein the vertical angle between said frame means and said mounting means may be adjusted.

10. Apparatus as set forth in claim 7 wherein the vertical angle between said frame means and said mounting means may be adjusted.

11. Apparatus as set forth in claim 10 wherein second power-operated means are connected to said frame means to adjust the angle between the longitudinal axes of said roller means and additional power means are interposed between said frame means and said mounting means to adjust said vertical angle.

12. A method of retrieving a fishing net that includes providing a V-shaped gap defined by at least two proximate surfaces that are power-driven in a direction away from the original position of said net, and concurrently adjusting the angle of said gap to vary the amount of friction being applied to said net by said surfaces.

References Cited

UNITED STATES PATENTS

| | | | |
|---|---|---|---|
| 2,753,040 | 7/1956 | Rasmussen | 226—177 |
| 3,009,617 | 11/1961 | Brown | 226—177 |
| 3,069,799 | 12/1962 | Puretic | 254—137 |
| 3,305,218 | 2/1967 | Bjorshol | 254—137 |

HARVEY C. HORNSBY, Primary Examiner

U.S. Cl. X.R.

43—8; 226—177